United States Patent

Tsuchida

[11] Patent Number: 5,986,817
[45] Date of Patent: *Nov. 16, 1999

[54] EYEPIECE LENS

[75] Inventor: Hirofumi Tsuchida, Hachioji, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/662,542

[22] Filed: Jun. 12, 1996

[30] Foreign Application Priority Data

Jun. 15, 1995 [JP] Japan ................................ 7-148769

[51] Int. Cl.[6] .............................. G02B 3/00; G02B 25/00; G02B 9/04
[52] U.S. Cl. ......................... 359/647; 359/646; 359/654; 359/793
[58] Field of Search .................................. 359/643–647, 359/654–655, 796, 802, 793–795

[56] References Cited

U.S. PATENT DOCUMENTS

| 4,730,905 | 3/1988 | Takada ..................................... 359/645 |
| 4,735,491 | 4/1988 | Takahashi ............................... 359/652 |
| 5,182,672 | 1/1993 | Mukai et al. ........................... 359/652 |
| 5,523,885 | 6/1996 | Aoki ....................................... 359/654 |

FOREIGN PATENT DOCUMENTS 4-102818  4/1992  Japan .

OTHER PUBLICATIONS

Applied Optics, Apr. 1, 1980, vol. 19, No. 7, pp. 1081–1086.
Applied Optics, Mar. 15, 1982, vol. 21, No. 6, pp. 993–998.
Applied Optics, Feb. 1, 1983, vol. 22, No. 3, pp. 407–412.

*Primary Examiner*—Georgia Epps
*Assistant Examiner*—Jordan M. Schwartz
*Attorney, Agent, or Firm*—Kenyon & Kenyon

[57] ABSTRACT

An eyepiece lens comprising a single gradient-index lens having a positive refracting power, or comprising a radial gradient-index lens having a positive refracting power, and a field lens, wherein the following Eqs. are satisfied:

$$1 < \Phi_m/\Phi < 1.5 \quad (1)$$

$$|\Phi_{S1}| < -\Phi_{S2} \quad (2)$$

$$-0.01 < 1/V_1 < 0.025 \quad (3)$$

where $\Phi$ is the refracting power of the radial gradient-index lens, $\Phi_m$ is the refracting power of a medium of the radial gradient-index lens, $\Phi_{S1}$ is the refractive power of a surface located on the eye side of the radial gradient-index lens, $\Phi_{S2}$ is the refracting power of a surface located on the object side of the radial gradient-index lens, and $V_1$ is a coefficient of color dispersion of the medium of the radial gradient-index lens.

8 Claims, 34 Drawing Sheets

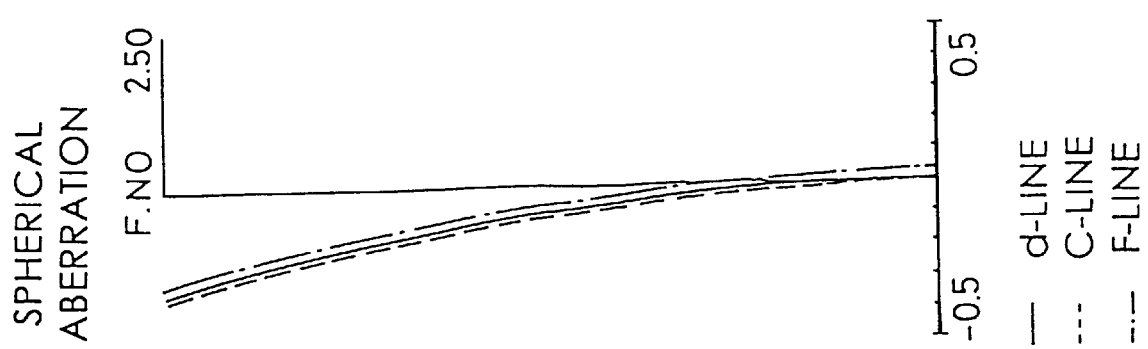

FIG. 6(d)

CHROMATIC
ABERRATION OF
MAGNIFICATION

IM.H 6.00

-0.02    0.02

— d-LINE
--- C-LINE
-·- F-LINE

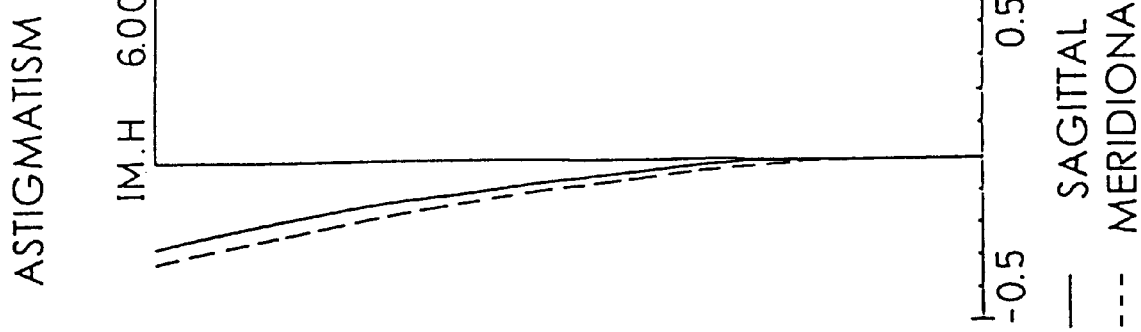

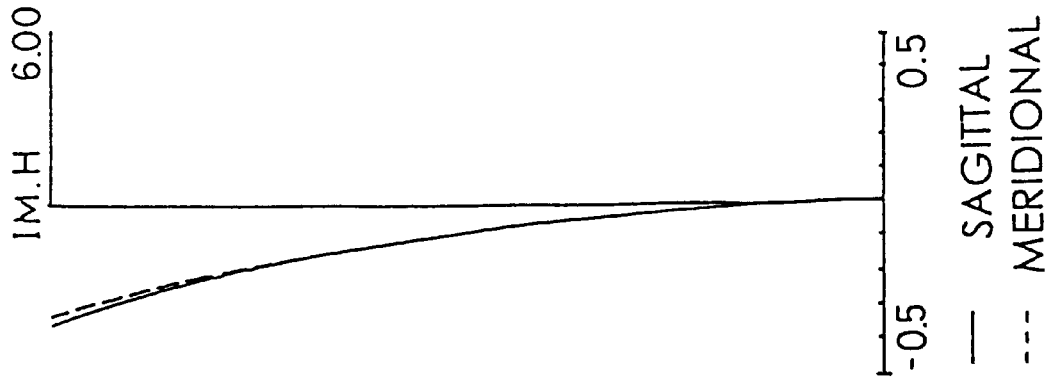

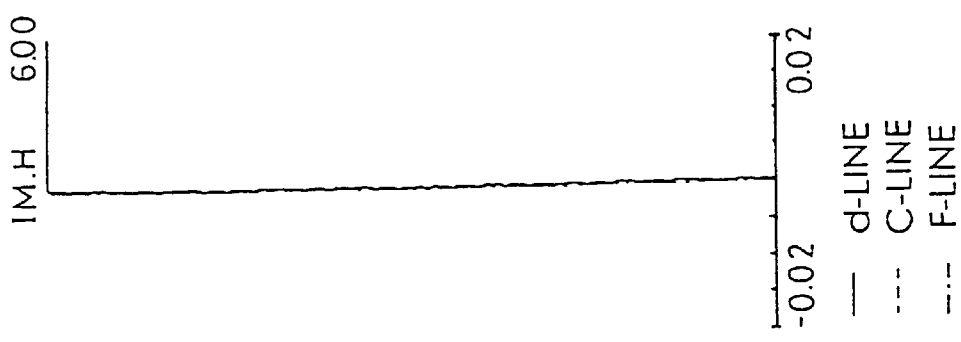

EYEPIECE LENS

BACKGROUND OF THE INVENTION

1. Field of the Invention

The present invention relates to an eyepiece lens which can be applied to a telescope, a microscope, a viewfinder of a camera, or the like, or can be used as a magnifier.

2. Description of the Related Art

As a simply structured eyepiece lens applied to a telescope, a microscope, or the like, Ramsden's and Kellner's types are well known. An eyepiece lens of these types of eyepiece lenses comprises an eye lens positioned on the side of the observer's eyes, and a field lens positioned on the side of an object or an object image to be magnified. Ramsden's type comprises an eye lens, and a field lens. Kellner's type comprises an eye lens as chromatic doublets, and a field lens. Further, as an eyepiece lens using a new lens element, Japanese Published Patent Application Publication No. Sho 62-32414 discloses an eyepiece lens using a radial gradient-index lens. This publication discloses two embodiment. One is an eyepiece lens comprising two radial gradient-index lenses. The other is an eyepiece lens comprising a radial gradient-index lens, and a homogeneous spherical lens.

In addition, J. D. Forer et al. describe an eyepiece lens applying an axial gradient-index lens to Ramsden's or Kellner's types in Journal of Applied Optics, Vol. 22, No. 3, pp. 407–412, (1983). In Ramsden's type, the eye lens is composed of a homogeneous lens, so that chromatic aberration, field curvature, and spherical aberration are large. Even if an aspherical surface is introduced in this type of lens, the chromatic aberration, and the field curvature cannot be compensated. Compared with Ramsden's type, the eye lens of Kellner's type is composed of the chromatic doublets, so that the chromatic aberration and the spherical aberration are well compensated, but the field curvature is not sufficiently compensated. In addition, since the chromatic doublets are very expensive, it is difficult to reduce costs in Kellner's type.

On the other hand, in the eyepiece lens using the radial gradient-index lens disclosed in Japanese Laid-Open Patent Application Publication No. Sho 62-32414, the spherical aberration and the field curvature are large. Moreover, the chromatic aberration of the eyepiece lens is not particularly referred to and it might not be considered at all. Further, in the eyepiece lens disclosed in Journal of Applied Optics, since the gradient-index lens used is of an axial type, the aberrations are on the same level as those of Ramsden's or Kellner's type are compensated by introducing an aspherical lens, and thus the chromatic aberration and the field curvature cannot be sufficiently compensated.

SUMMARY OF THE INVENTION

It is an object of the present invention to provide a simply structured eyepiece lens comprising one or two lenses, wherein field curvature, chromatic aberration, spherical aberration, and the like are well compensated.

A first feature of the present invention resides, briefly stated, in an eyepiece lens comprising a radial gradient-index lens having a positive refracting power, wherein the eyepiece lens satisfies the following Eqs.

$$1 < \Phi_m/\Phi < 1.5 \quad (1)$$

$$|\Phi_{S1}| < -\Phi_{S2} \quad (2)$$

$$-0.01 < 1/V_1 < 0.025 \quad (3)$$

A second feature of the present invention is to provide an eyepiece lens comprising in the order a radial gradient-index lens having a positive refracting power, and a field lens from the eye side, wherein the eyepiece lens satisfies the following Eqs.

$$1 < \Phi_m/\Phi < 1.5 \quad (1)$$

$$|\Phi_{S1}| < -\Phi_{S2} \quad (2)$$

$$-0.01 < 1/V_1 < 0.025 \quad (3)$$

In Eqs. (1) to (3), $\Phi$ is the refracting power of the radial gradient-index lens, $\Phi_m$ is the refracting power of the medium of the radial gradient-index lens, $\Phi_{s1}$ is the refracting power of the surface, located on the eye side, of the radial gradient-index lens, $\Phi_{S2}$ is the refracting power of the surface, located on the opposite side from the eye, of the refracting power of the radial gradient-index lens, and $V_1$ is a coefficient of color dispersion of the medium of the radial gradient-index lens.

DESCRIPTION OF THE PREFERRED EMBODIMENTS

Figure 1:
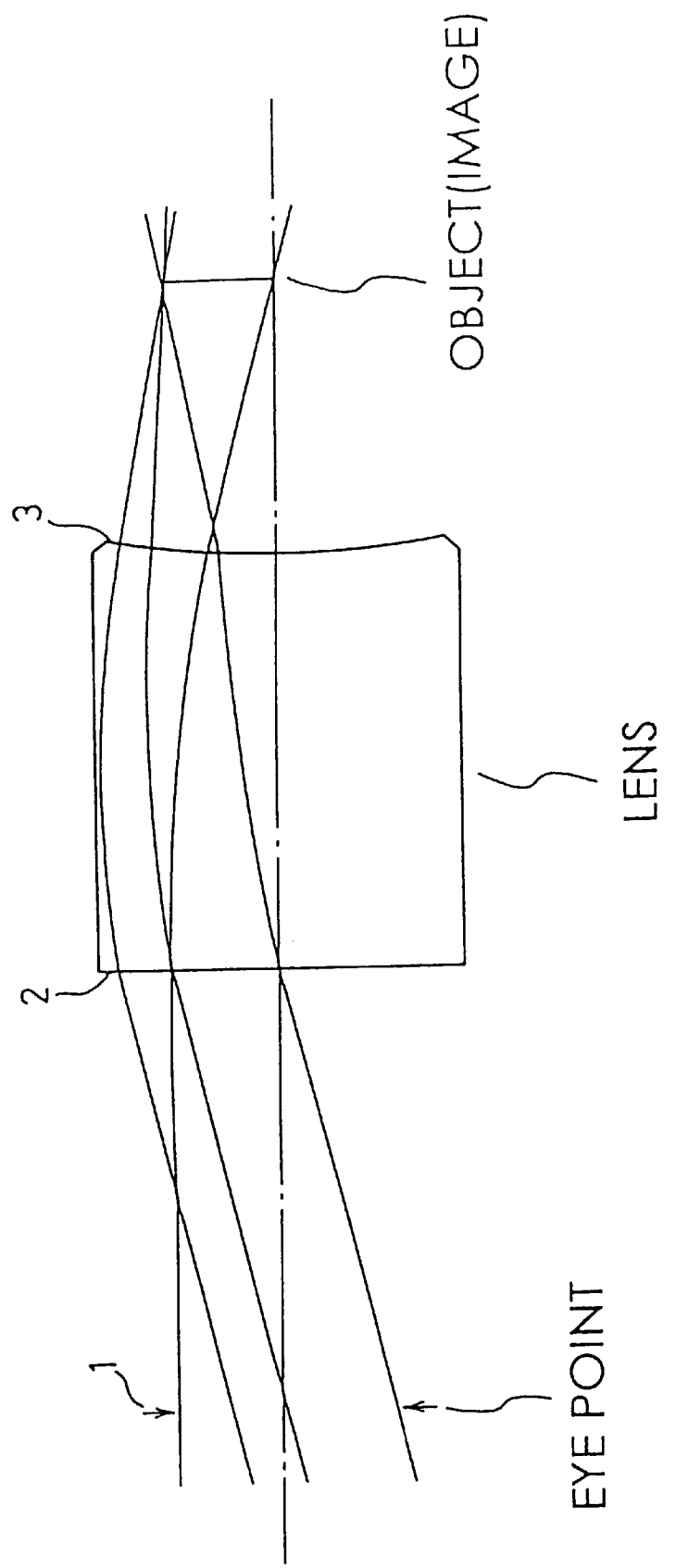
FIG. 1 is a sectional view of a first embodiment of the present invention.

An eyepiece lens of the present invention basically comprises a radial gradient-index lens for sufficiently compensating its aberrations by using a few lenses. The refractive index n(r) of a gradient-index lens is expressed as follows:

$$n(r) = N_0 + N_1 r^2 + N_2 r^4 + \ldots, \quad (a)$$

where r is the distance from the optical axis, and $N_0$, $N_1$, $N_2$, . . . , are coefficients representing the gradient-index profile. Each coefficient has different values corresponding to respective wavelengths. When the coefficients for respective wavelengths are represented by adding subscripts representing the wavelengths (d, F, C, etc. ), the coefficients representing the color dispersion of the radial gradient-index lens are obtained by the following Eqs.

$$V_0 = (N_{0d} - 1)/(N_{0F} - N_{0C}) \tag{b}$$

$$V_i = N_{id}/(N_{iF} - N_{iC}) \ (i=1, 2, 3, \ldots) \tag{c}$$

where $N_{0d}$ is a value of coefficient $N_0$ corresponding to the d line, $N_{0F}$ is a value of coefficient $N_0$ corresponding to the F line, $N_{0C}$ is a value of coefficient $N_0$ corresponding to the C line, $N_{id}$ is a value of coefficient $N_i$ corresponding to the d line, $N_{iF}$ is a value of coefficient $N_i$ corresponding to the F line, and $N_{iC}$ is a value of coefficient $N_i$ corresponding to the C line.

L. G. Atkinson et al. stated in Journal of Applied Optics, Vol. 21, No. 6, pp. 993–998, (1982) that field curvature, chromatic aberration, spherical aberration or the like of a gradient-index lens can be compensated easier than those of a homogeneous spherical lens. On the other hand, D. T. Moor et al. stated in Journal of Applied Optics, Vol. 19, No. 7, pp. 1081–1086, (1980) that, in the case of only one gradient-index lens, it is not possible to highly compensate Seidel aberrations in addition to an axial chromatic aberration and a chromatic aberration of magnification. Therefore, when the seven aberrations are highly compensated in a photographic lens using gradient-index lenses, it has been considered that two or more lenses are required. For example, as disclosed by L. D. Atkinson et al. in the Journal of Applied Optics cited above, two gradient-index lenses are positioned with an aperture stop intervening therebetween. However, in a eyepiece lens, a little amount of field curvature and distortion can be allowed to remain due to the characteristics of human eyes. In the present invention, this fact is taken into account to consider the structure of an eyepiece lens having one gradient-index lens in which aberration are compensated on a practical level. In this case, the field curvature, the spherical aberration, the chromatic aberration, and the astigmatism are especially problematic in compensating aberrations.

Thus, the compensation of these aberrations will now be described. In the following description, in contrast to the normal usage of the eyepiece lens, it is assumed that light enters from the eye side, which is called reverse ray tracing.

In order to sufficiently compensate the field curvature, it is required to satisfy the following Eq. (1).

$$<1 \Phi_m/\Phi < 1.5 \tag{1}$$

where $\Phi$ is the refracting power of the radial gradient-index lens, $\Phi_m$ is a refracting power of the medium of the radial gradient-index lens.

PTZ, that is Petzval's sum, of a single gradient-index lens is obtained by Eq. (d).

$$PTZ = \Phi_S/N_0 + \Phi_m/N_0^2 \tag{d}$$

where $\Phi_s$ is the refracting power of the surfaces of the gradient-index lens, and the refracting power of the gradient-index lens is obtained by the Eq. (e) when a thin lens approximation is applied.

$$\Phi = \Phi_S + \Phi_m \tag{e}$$

It is understood from Eqs. (d) and (e) that the gradient-index lens having a refracting power in the medium is capable of improving the field curvature compared to the homogeneous lens. For example, when the medium has all the refracting power $\Phi$ of the lens, that is $\Phi_m/\Phi=1$, PTZ of the gradient-index lens is $1/N_0$ of that of the homogeneous lens. When the medium has the refracting power $N_0$ times as much as that of the gradient-index lens, that is $\Phi_m/\Phi N_0$, PZT of the gradient-index lens is zero. Considering a balance to the other aberrations, it is better to leave a little amount of positive PZT, so that Eq. (1) is set. When the value of $\Phi_m/\Phi$ is exceeds the lower limit of Eq. (1), the refracting power of the medium becomes weak and the field curvature cannot be ignored. When the value of $\Phi_m/\Phi$ exceeds the upper limit of Eq. (1), the balance to the other aberrations gets worse. Especially, coma is increased. When the medium has a power such that the value that $\Phi_m/\Phi$ exceeds the upper limit of Eq. (1), the difference of the refractive index between the center of the lens and its peripheral portion is very large, so that the lens material is hard to make.

The compensation of the astigmatism and the spherical aberration will now be described. When the eyepiece is composed of one gradient-index lens, the compatibility of the compensation of the astigmatism and the spherical aberration is a key thought.

In the present invention, the refracting power of surfaces of the gradient-index lens satisfies Eq. (2), so that the astigmatism and the spherical aberration is practically compatible.

$$|\Phi_{S1}| < -\Phi_{S2} \tag{2}$$

where $\Phi_{S1}$ is the refracting power of the surface located on the eye side of the radial gradient-index lens, and $\Phi_{S2}$ is the refracting power of the surface located on the side opposite to the eye side of the radial gradient-index lens.

Since the refracting power of the medium is larger than that of the lens in Eq. (1) in order to compensate the field curvature, it is necessary for the surfaces to have some negative refracting power. It is important how to divide the negative refracting power between two surfaces. As represented by Eq. (2), a relatively weak refracting power is given to the surface on the eye side and a relatively strong negative refracting power is given to the surface on the side opposite to the eye side so that the surfaces as a whole can have a negative refracting power without refracting the axial rays strong at the respective surfaces. In other words, when $\Phi_{S1}$ and $\Phi_{S2}$ are selected to satisfy Eq. (2), the spherical aberration on the surfaces are substantially minimized. When $\Phi_{S1}$ and $\Phi_{S2}$ are not selected to satisfy Eq. (2), the rays are largely refracted, so that the spherical aberration cannot easily be compensated maintaining the well balanced astigmatism.

In order to compensate the chromatic aberration, especially the chromatic aberration of magnification which may cause problems, it is desirable that coefficient $V_1$ representing the color dispersion of the medium satisfies Eq. (3).

$$-0.01 < 1/V_1 < 0.025 \tag{3}$$

The larger absolute value of $V_1$, the better the chromatic aberration in the medium is well compensated. However, in view of the compensation effect on the surfaces, it is better to select $V_1$ to satisfy Eq. (3).

When the upper limit of Eq. (3) is exceeded, the chromatic aberration, especially the chromatic aberration of magnification becomes too large. When the lower limit of Eq. (3) is exceeded, the chromatic aberration is overcorrected.

Moreover, it is better to select both $\Phi_{S1}$ and $\Phi_{S2}$ to satisfy Eqs. (4) and (5) in order to balance the compensation of the astigmatism and the spherical aberration.

$$-0.2 < \Phi_{S1}/\Phi < 0.3 \quad (4)$$

$$-0.7 < \Phi_{S2}/\Phi < -0.1 \quad (5)$$

When $\Phi_{S1}/\Phi$ exceeds the lower limit of Eq. (4), the spherical aberration is increased in the negative direction. Moreover, the height of incidence of the axial marginal ray in the medium is increased, so that the diameter of the lens becomes large. On the other hand, when $\Phi_{S1}/\Phi$ exceeds the upper limit of the Eq. (4), the negative refracting power $\Phi_{S2}$ of the surface on the side opposite to the eye is increased, so that it is not balanced with the field curvature to the other aberrations. Especially, the distortion is increased in the negative direction. When $\Phi_{S2}/\Phi$ exceeds the lower limit of Eq. (5), the other aberrations such as distortion are increased. When $\Phi_{S2}/\Phi$ exceeds the upper limit of Eq. (5), the spherical aberration cannot be sufficiently compensated.

Further, it is better that the coefficient $N_2$ of the medium satisfies Eq. (6) for balancing the astigmatism with the spherical aberration.

$$0 < N_2/\Phi^4 < 0.4 \quad (6)$$

By changing the value of $N_2$, the spherical aberration and the astigmatism can be changed, wherein total refracting powers are not changed. When $N_2$ is increased in the positive direction, the spherical aberration is compensated in the positive direction. When $N_2$ is too much increased, a meridional image surface is largely inclined in the positive direction so that the astigmatism is increased. When $N_2$ satisfies Eq. (6), the balance is well kept. When $N_2/\Phi^4$ exceeds the lower limit of Eq. (6), the spherical aberration is too much increased in the negative direction. When $N_2/\Phi^4$ exceeds the upper limit of Eq. (6), the astigmatism cannot be compensated. When satisfying Eq. (6), the spherical aberration is a little under in a practically tolerable range and the astigmatism can be substantially compensated. The distortion also remains a little in the negative direction just like the spherical aberration, but it can be compensated in an allowable range.

Examples of the present invention will now be shown below. Data and figures of each example are shown in the state of so-called reverse ray tracing wherein light from the eye side, just like in the above description. In the data, $V_0$, $V_1$ and $V_2$ are parameters which represent the distribution of the refracting power. With respect to the partial dispersion ratio, the value on the axis is calculated by Herzberger's formula, and the values of high-order terms are equally to 0.3.

EXAMPLE 1

Magnification of Magnifying Lens=20x, Field Number=6, Diameter of Pupil at Eye Point=6

| k | r | d | $N_0/V_0$ | $N_1/V_1$ | $N_2/V_2$ |
|---|---|---|---|---|---|
| 1 | Eye Point | 12.00 | | | |
| 2 | ∞ | 11.44 | 1.65 | -0.49845E-2 | 0.60442E-5 |
| | | | 50 | 243.2 | 243.2 |
| 3 | 20.8950 | | | | |

$\Phi_m/\Phi = 1.25$, $\Phi_{S1}/\Phi = 0$, $\Phi_{S2}/\Phi = -0.39$, $N_2/\Phi^4 = 0.148$, $1/V_1 = 0.004$

In the above table, k is the number of a surface, r is the radius of curvature of a surface, and d is the distance between surfaces. With respect to $N_0/V_0$ and the like, the upper and lower row values are the values of $N_0$ and $V_0$, respectively. E represents a power of 10: for example, E−2 means ×10$^{-2}$.

Figure 2A:
FIGS. 2(a), (b), (c), and (d) show aberrations of the first embodiment of the present invention.
Figure 2B:
Figure 2C:
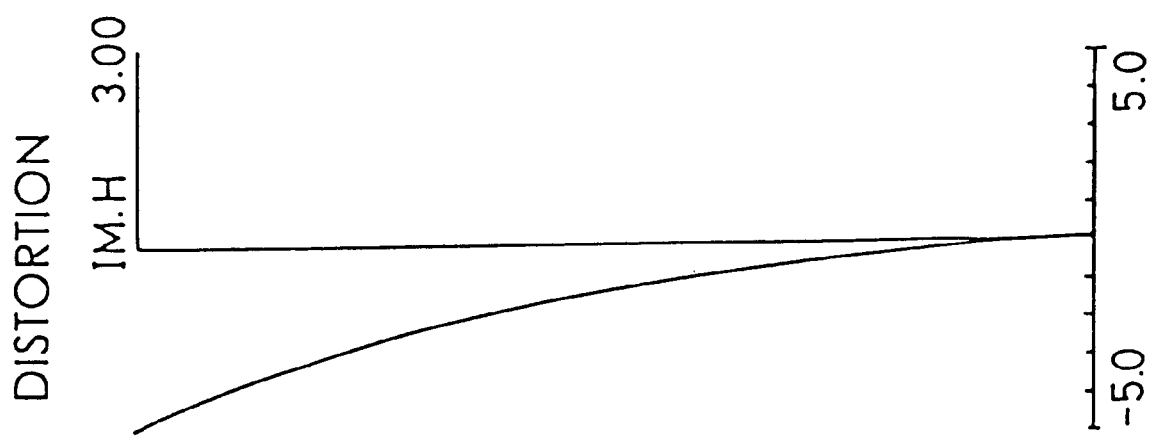
Figure 2D:

The shape of the lens of this example is shown in FIG. 1. The surface of the eye side is flat, and the surface of the object side is concave. Aberrations corresponding to a diopter of 0 D are shown in FIGS. 2(a), (b), (c), and (d). Each aberration is sufficiently compensated on a practical level. The lens has a telecentric structure in which an off-axial chief ray is substantially parallel to the optical axis on the side opposite to the eye. Thus, the lens has an advantage when it is combined with an objective lens having its exit pupil at infinity. Further since the surface located on the eye side is flat, the surface is easily worked.

EXAMPLE 2

Magnification of Magnifying Lens=lox, Field Number=18, Diameter of Pupil at Eye Point=10

| k | r | d | $N_0/V_0$ | $N_1/V_1$ | $N_2/V_2$ |
|---|---|---|---|---|---|
| 1 | Eye Point | 18.00 | | | |
| 2 | 740.6279 | 28.00 | 1.70 | -0.97639E-3 | 0.13465E-6 |
| | | | 50.0 | 370.1 | 370.1 |
| 3 | 53.9621 | | | | |

$\Phi_m/\Phi = 1.17$, $\Phi_{S1}/\Phi = 0.02$, $\Phi_{S2}/\Phi = -0.32$, $N_2/\Phi^4 = 0.053$, $1/V_1 = 0.003$

Figure 3:
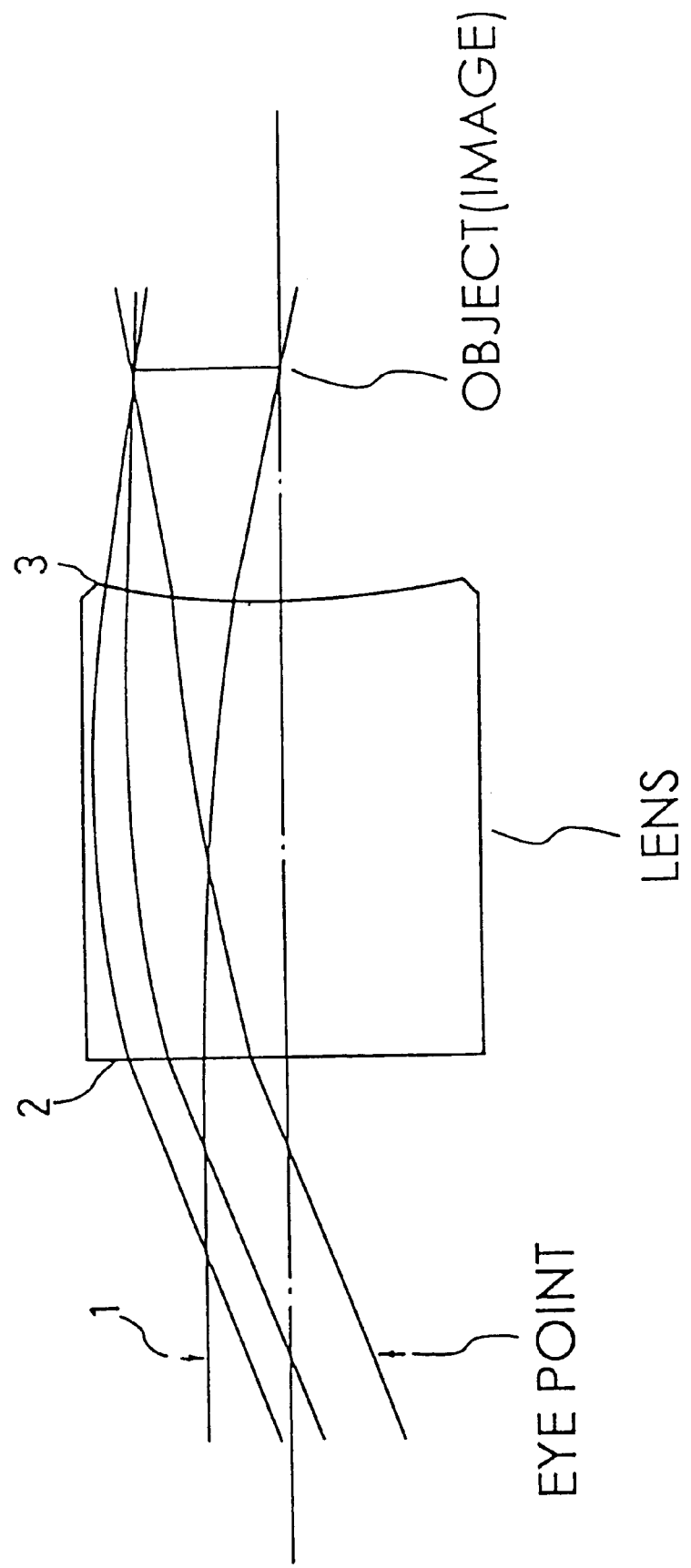
FIG. 3 is a sectional view of a second embodiment of the present invention.
Figure 4B:
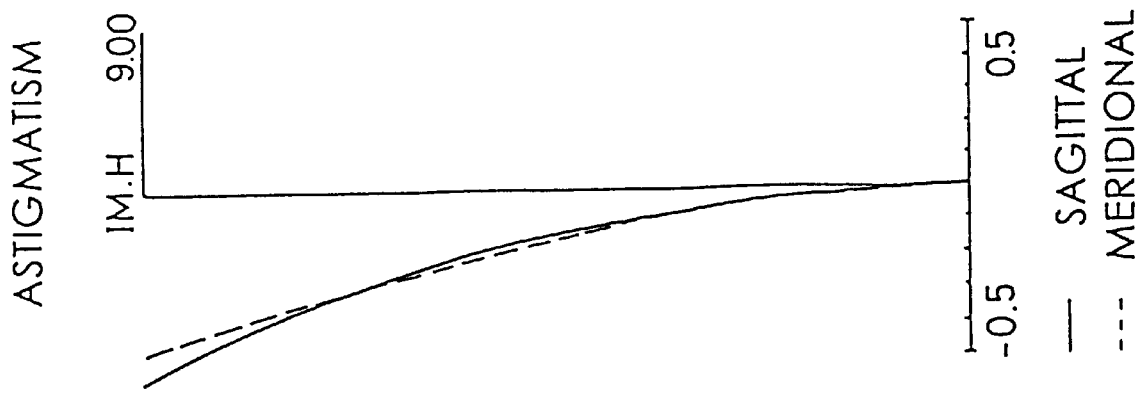
FIGS. 4(a), (b), (c), and (d) show aberrations of the second embodiment of the present invention.
Figure 4C:
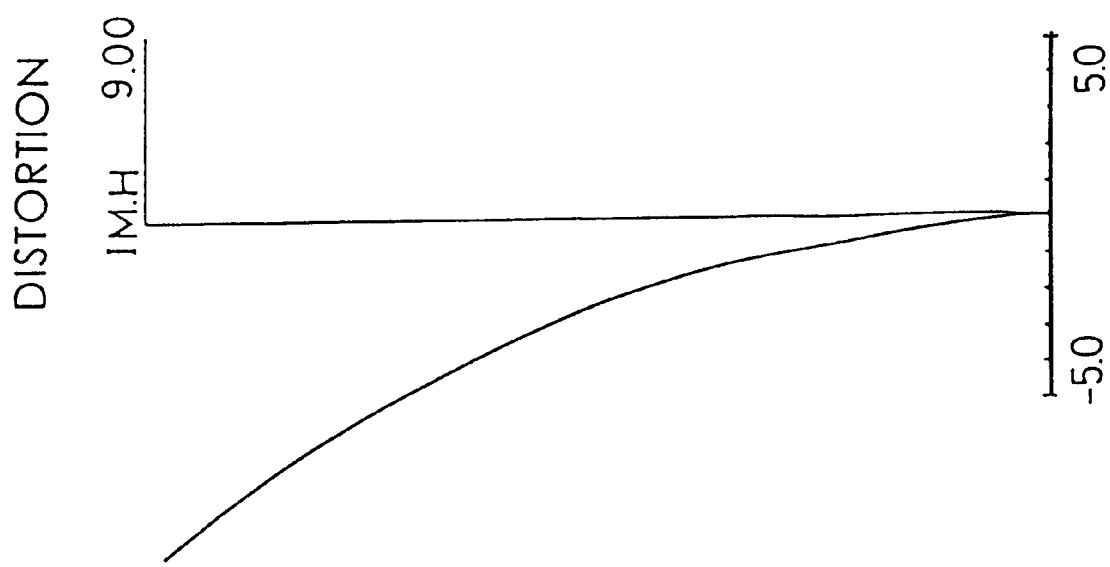

The shape of the lens of this example is shown in FIG. 3. In Example 2, the surface located on the eye side is convex, and the surface located on the side opposite to the eye side is concave. Aberrations corresponding to a diopter of 0 D are shown in FIGS. 4(a), (b), (c), and (d). Each aberration is sufficiently compensated on a practical level. The lens has a telecentric structure in which an off-axial chief ray is substantially parallel to the optical axis on the side opposite to the eye. Thus, the lens has an advantage when it is combined with an objective lens having its exit pupil at infinity.

EXAMPLE 3

Magnification of Magnifying Lens=10x, Field Number=12, Diameter of Pupil at Eye Point=12

| k | r | d | $N_0/V_0$ | $N_1/V_1$ | $N_2/V_2$ |
|---|---|---|---|---|---|
| 1 | Eye Point | 24.00 | | | |
| 2 | 95.7753 | 24.33 | 1.70 | -0.11359E-2 | 0.17221E-6 |
| | | | 50.0 | 295.2 | 295.2 |
| 3 | 29.2868 | | | | |

$\Phi_m/\Phi = 1.21$, $\Phi_{S1}/\Phi = 0.18$, $\Phi_{S2}/\Phi = -0.60$, $N_2/\Phi^4 = 0.067$, $1/V_1 = 0.003$

Figure 5:
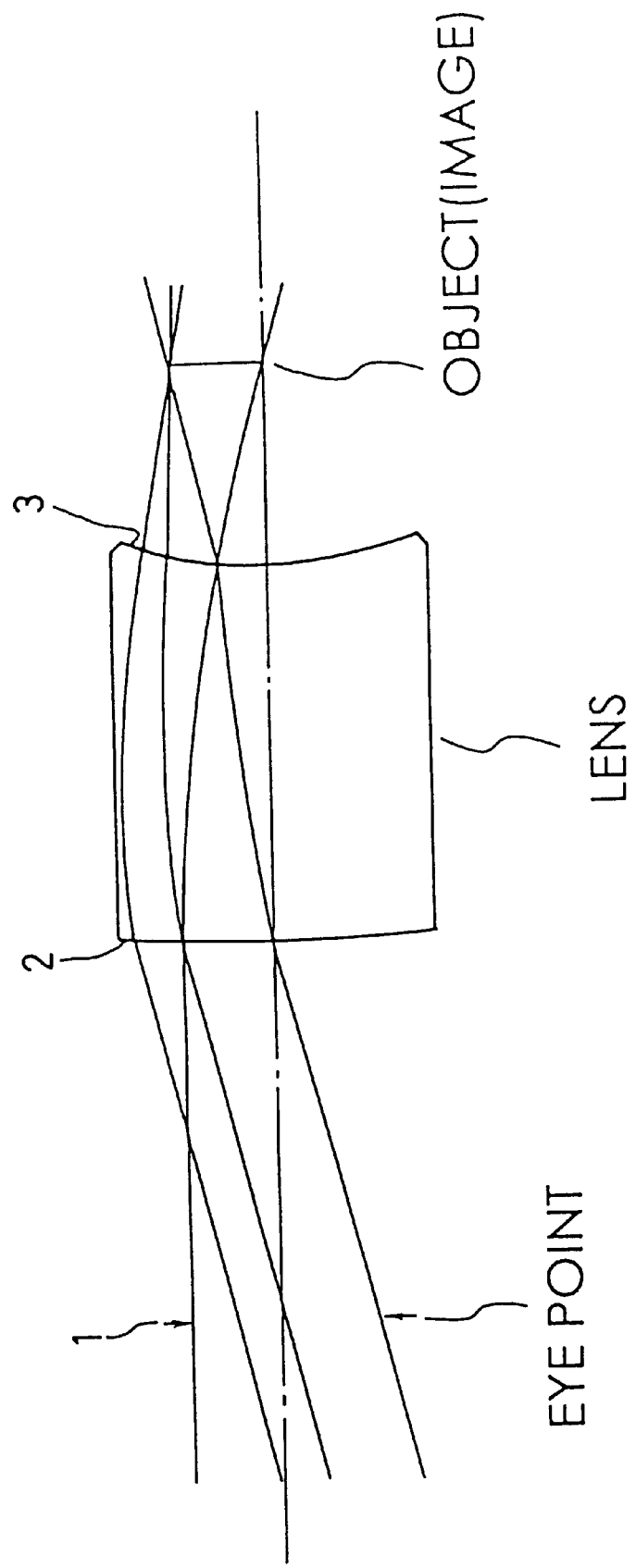
FIG. 5 is a sectional view of a third embodiment of the present invention.
Figure 6B:
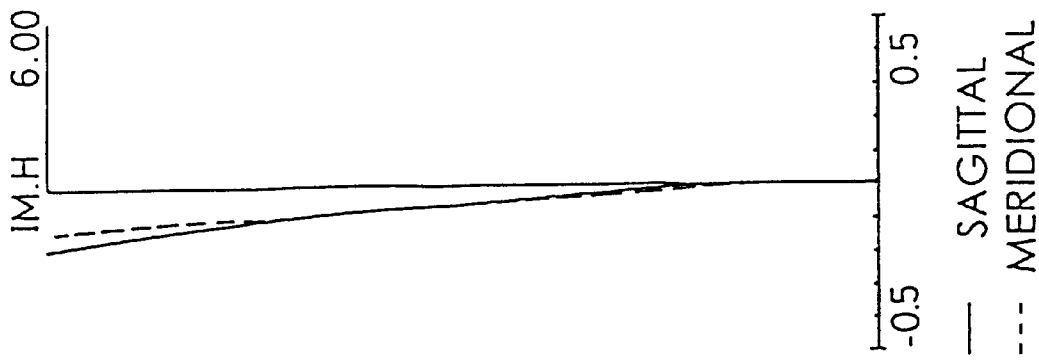
FIGS. 6(a), (b), (c), and (d) show aberrations of the third embodiment of the present invention.

The shape of the lens of this example is shown in FIG. 5. In Example 3, the surface located on the eye side is convex, and the surface located on the side opposite to the eye side is concave. Aberrations corresponding to a diopter of 0 D are shown in FIGS. 6(a), (b), (c), and (d). Each aberration is sufficiently compensated on a practical level. The lens has a telecentric structure in which an off-axial chief ray is substantially parallel to the optical axis on the side opposite to the eye. Thus, the lens has an advantage when it is combined with an objective lens having its exit pupil at infinity.

EXAMPLE 4

Magnification of Magnifying Lens=10×, Field Number=12, Diameter of Pupil at Eye Point=10

| k | r | d | $N_0/V_0$ | $N_1/V_1$ | $N_2/V_2$ |
|---|---|---|---|---|---|
| 1 | Eye Point | 15.00 | | | |
| 2 | −227.7576 | 16.90 | 1.70<br>45.0 | −0.15863E-2<br>327.6 | 0.56878E-6<br>327.6 |
| 3 | 81.1557 | | | | |

$\Phi_m/\Phi = 1.22$, $\Phi_{S1}/\Phi = -0.08$, $\Phi_{S2}/\Phi = -0.22$, $N_2/\Phi^4 = 0.22$, $1/V_1 = 0.003$

Figure 7:
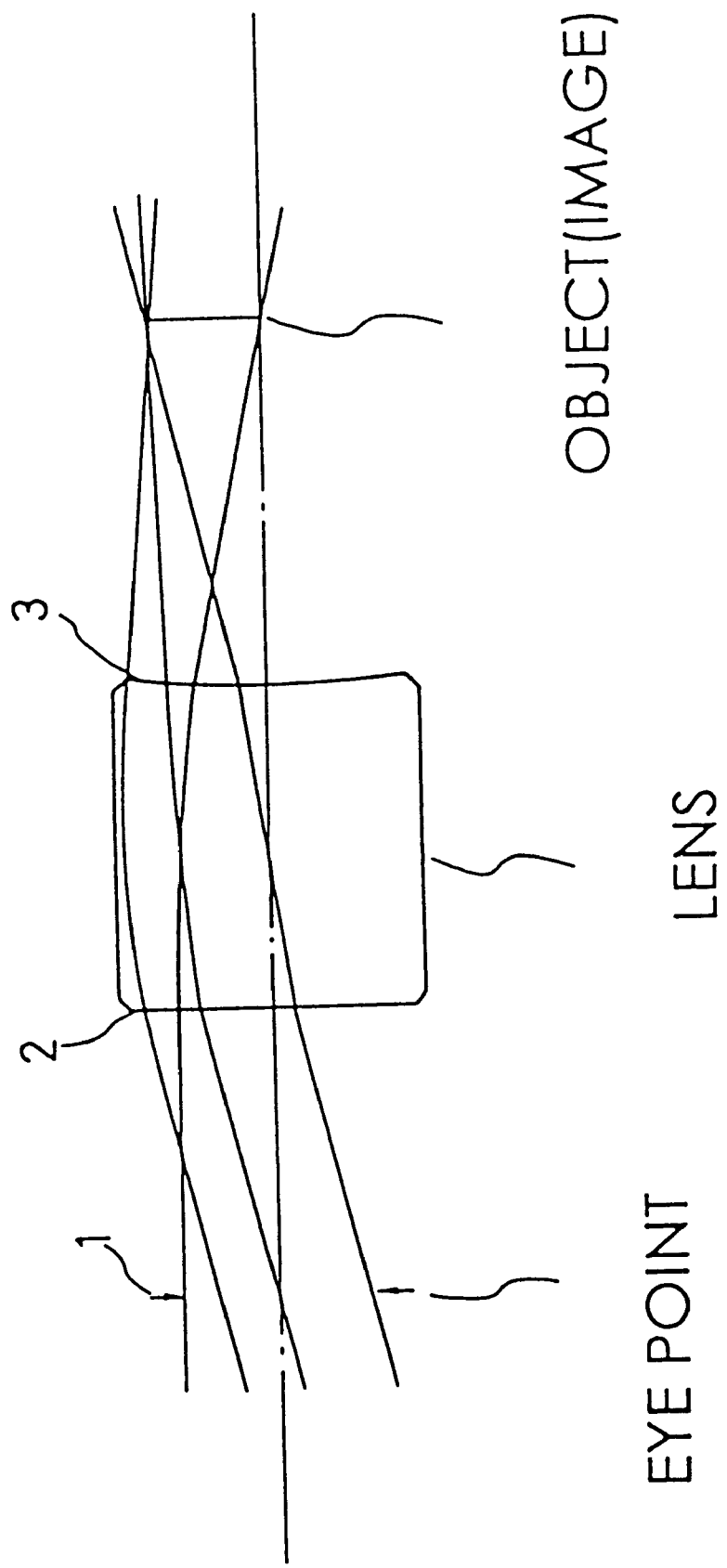
FIG. 7 is a sectional view of a fourth embodiment of the present invention.
Figure 8B:
FIGS. 8(a), (b) and (c) show aberrations of the fourth embodiment of the present invention.
Figure 8C:

The shape of the lens of this example is shown in FIG. 7. In Example 4, both the surface located on the eye side and the surface located on the side opposite to the eye side are concave. Aberrations corresponding to a diopter of 0 D are shown in FIGS. 8(a), (b) and (c). Each aberration is sufficiently compensated on a practical level.

EXAMPLE 5

Magnification of Magnifying Lens=10×, Field Number=12, Diameter of Pupil at Eye Point=10

| k | r | d | $N_0/V_0$ | $N_1/V_1$ | $N_2/V_2$ |
|---|---|---|---|---|---|
| 1 | Eye Point | 15.00 | | | |
| 2 | ∞ | 17.74 | 1.65<br>50.0 | −0.14844E-2<br>240.4 | 0.38814E-6<br>240.4 |
| 3 | 60.5658 | | | | |

$\Phi_m/\Phi = 1.20$, $\Phi_{S1}/\Phi = 0$, $\Phi_{S2}/\Phi = -0.27$, $N_2/\Phi^4 = 0.152$, $1/V_1 = 0.004$

Figure 9:
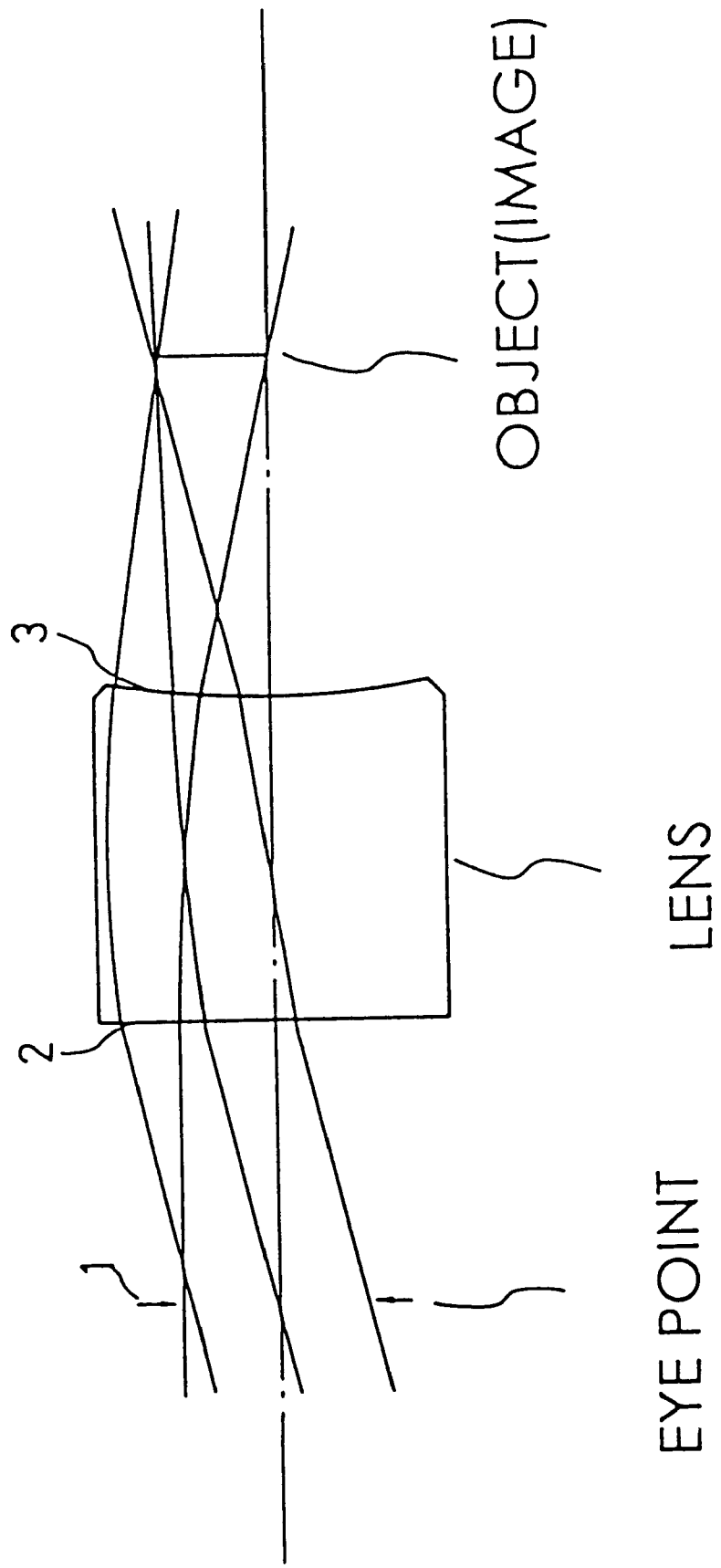
FIG. 9 is a sectional view of a fifth embodiments of the present invention.
Figure 10A:
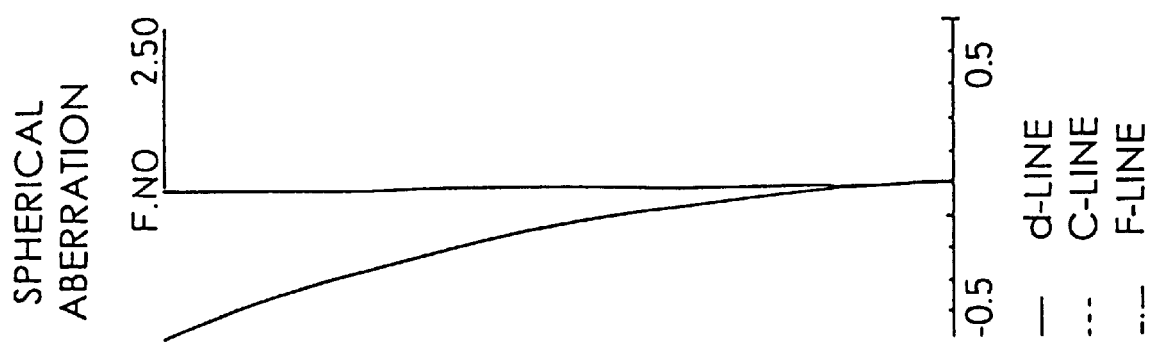
FIGS. 10(a), (b), (c), and (d) show aberrations of the fifth embodiment of the present invention.
Figure 10B:
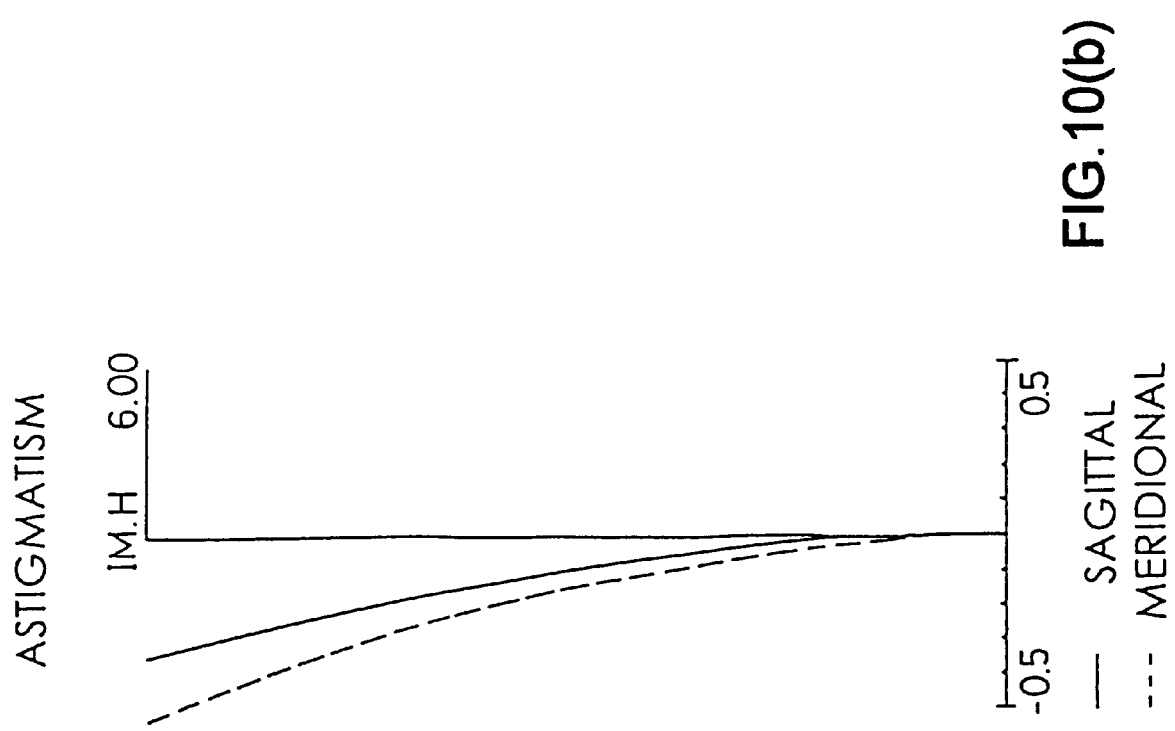
Figure 10C:
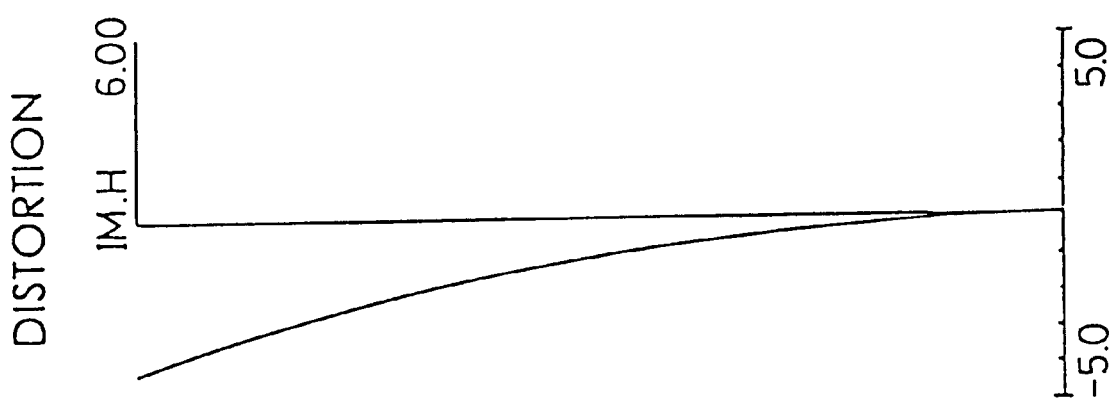
Figure 10D:
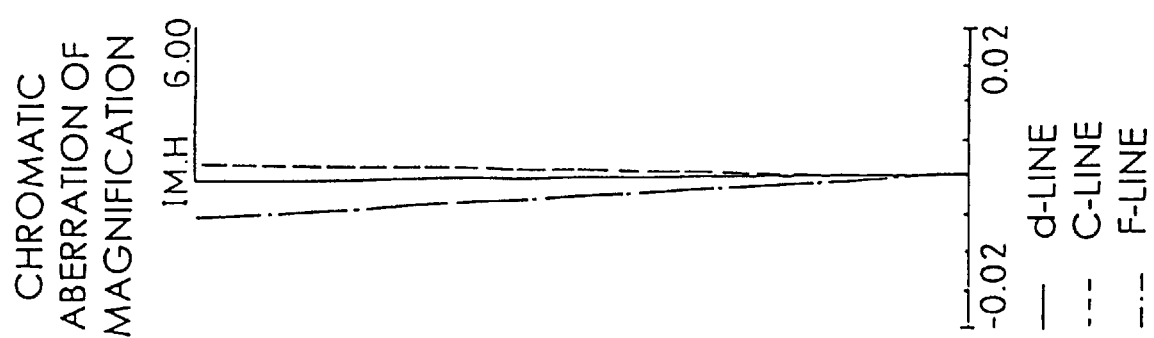

The shape of the lens of this example is shown in FIG. 9. In Example 5, the surface located on the eye side is flat, and the surface located on the side opposite to the eye side is concave. Aberrations corresponding to a diopter of 0 D are shown in FIGS. 10(a), (b), (c), and (d). Each aberration is sufficiently compensated on a practical level. Further, since the surface located on the eye side is flat, the surface is easily worked.

In the foregoing, examples of an eyepiece lens composed of a single gradient-index lens have been described in which aberrations are well compensated on a practical level. Next, examples of an eyepiece lens composed of a single gradient-index lens and a field lens will be described. For example, in optical systems of microscopes or the like, it is necessary to relay the exit pupil of the objective lens to the eye point of the eyepiece lens. In this case, as is well known, the field lens having a proper refracting power is arranged near the image (or object) to be magnified. That is, by adding the field lens to the eyepiece lens having the single gradient-index lens, it is possible to obtain the eyepiece lens in which the relay of the pupil from another optical systems is taken into account. Each of the following examples includes the field lens composed of a homogeneous lens.

EXAMPLE 6

Magnification of Magnifying Glass=10.4×, Field Number=12, Diameter of Pupil at Eye Point=10

| k | r | d | $N_0/V_0$ | $N_1/V_1$ | $N_2/V_2$ |
|---|---|---|---|---|---|
| 1 | Eye Point | 15.00 | | | |
| 2 | −225.7576 | 16.90 | 1.70<br>45.0 | −0.15863E-2<br>327.6 | 0.56878E-6<br>327.6 |
| 3 | 81.1557 | 15.00 | | | |
| 4 | 63.0816 | 3.00 | 1.51633<br>64.15 | | |
| 5 | −423.5582 | | | | |

$\Phi_m/\Phi = 1.22$, $\Phi_{S1}/\Phi = -0.08$, $\Phi_{S2}/\Phi = -0.22$, $N_2/\Phi^4 = 0.222$, $1/V_1 = 0.003$

Figure 11:
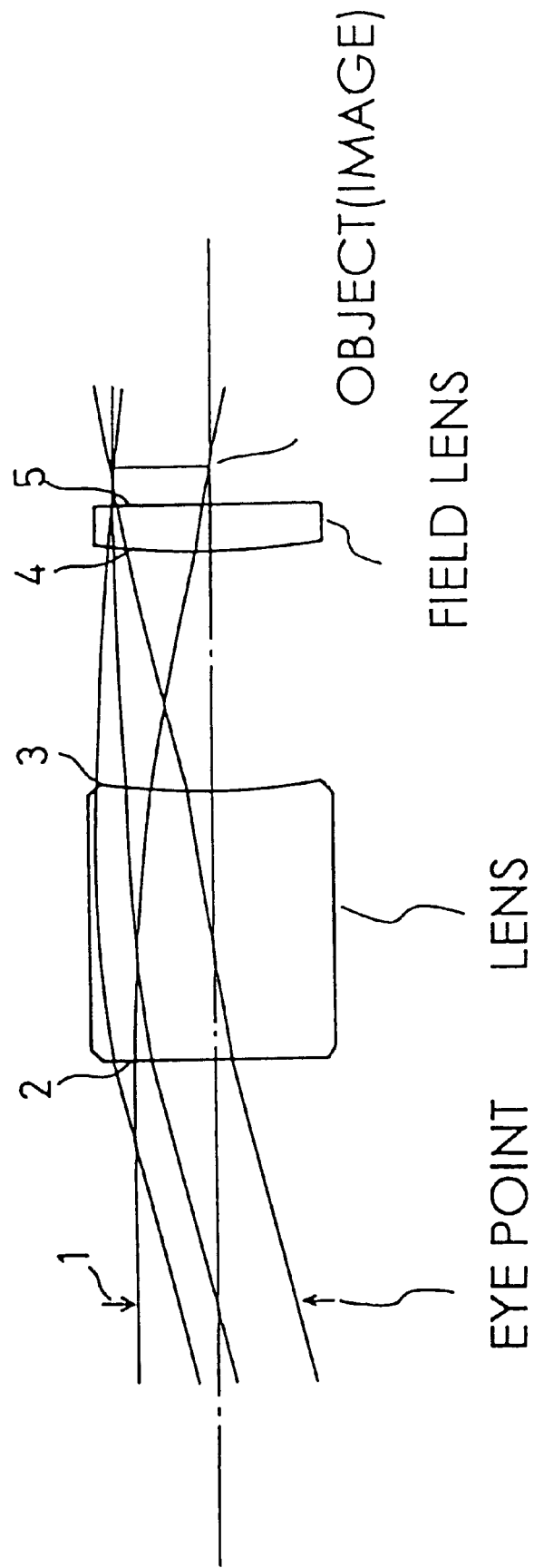
FIG. 11 is a sectional view of a sixth embodiment of the present invention.
Figure 12A:
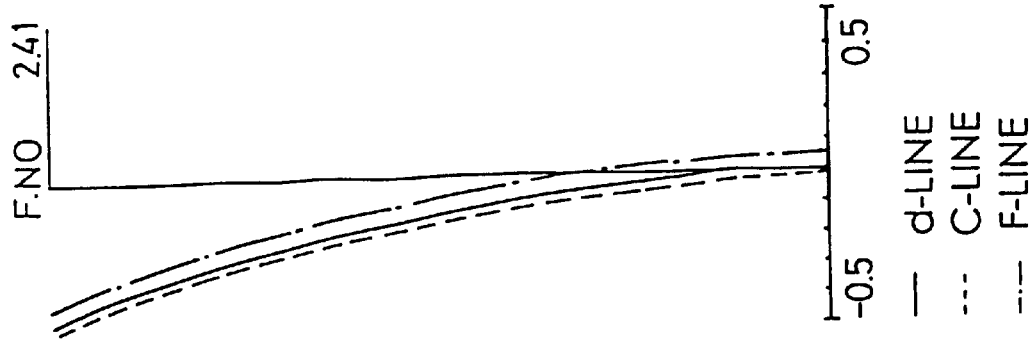
FIGS. 12(a), (b), (c), and (d) show aberrations of the sixth embodiment of the present invention.
Figure 12B:
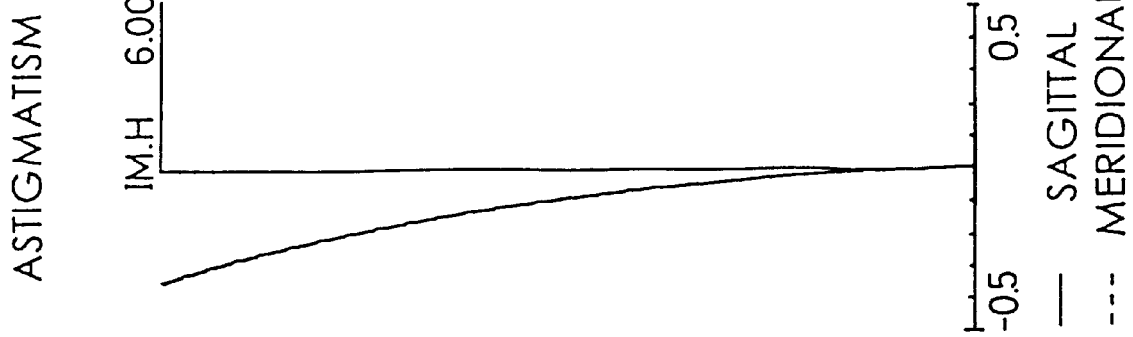
Figure 12D:
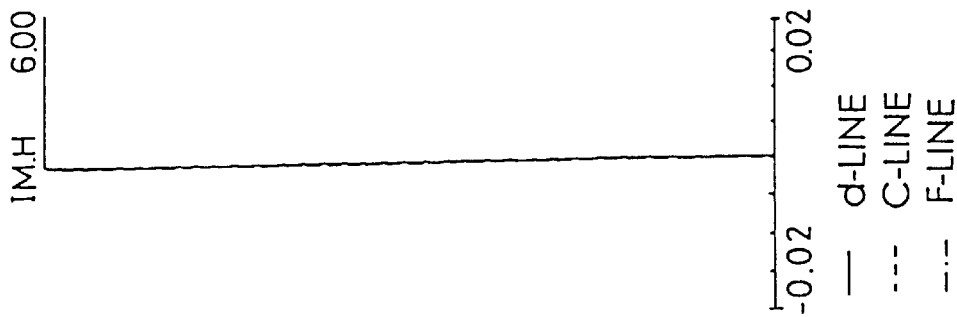

In example 6, a field lens is added to the eyepiece lens shown in example 4. The lens arrangement is shown in FIG. 11. The lens arrangement belongs to the outside focus type in which the field frame and the image to be magnified are arranged outside of the lens. Since the field lens is added, the pupil position can be variously controlled. In example 6, the lens has a telecentric structure in which an off-axial chief ray is substantially parallel to the optical axis on the side opposite to the eye. Thus, the lens has an advantage when it is combined with an objective lens having its exit pupil at infinity. Aberrations corresponding to a diopter of 0 D are shown in FIGS. 12(a), (b), (c), and (d). Each aberration is sufficiently compensated on a practical level.

EXAMPLE 7

Magnification of Magnifying Lens=9.2×, Field Number=12, Diameter of Pupil at Eye Point=10

| k | r | d | $N_0/V_0$ | $N_1/V_1$ | $N_2/V_2$ |
|---|---|---|---|---|---|
| 1 | Eye Point | 15.00 | | | |
| 2 | ∞ | 17.74 | 1.65<br>50.0 | −0.14844E-2<br>240.4 | 0.38814E-6<br>240.4 |
| 3 | 60.5658 | 23.00 | | | |
| 4 | −37.6292 | 3.00 | 1.51633<br>64.15 | | |
| 5 | −23.8682 | | | | |

$\Phi_m/\Phi = 1.20$, $\Phi_{S1}/\Phi = 0$, $\Phi_{S2}/\Phi = -0.27$, $N_2/\Phi^4 = 0.152$, $1/V_1 = 0.004$

Figure 13:
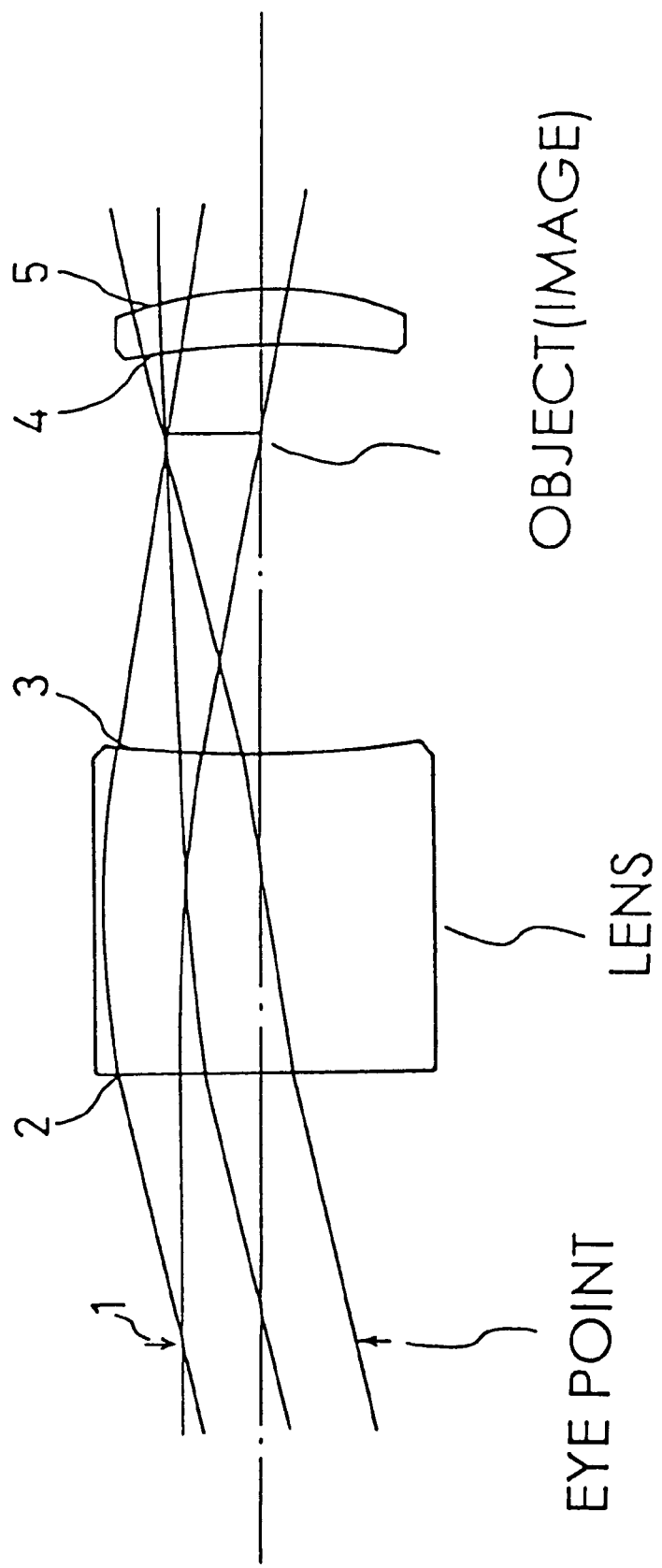
FIG. 13 is a sectional view of a seventh embodiment of the present invention.
Figure 14A:
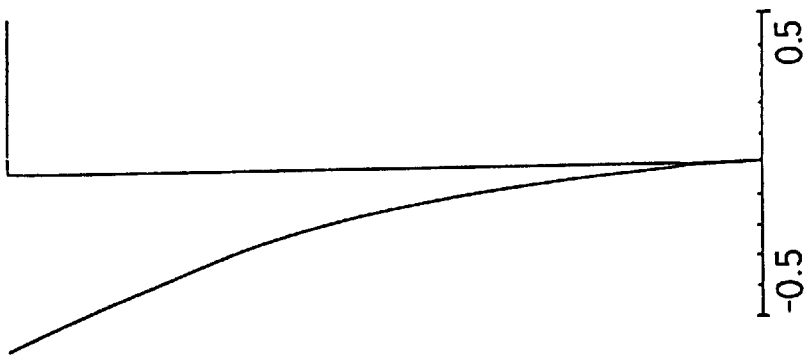
FIGS. 14(a), (b), (c), and (d) show aberrations of the seventh embodiment of the present invention.
Figure 14C:
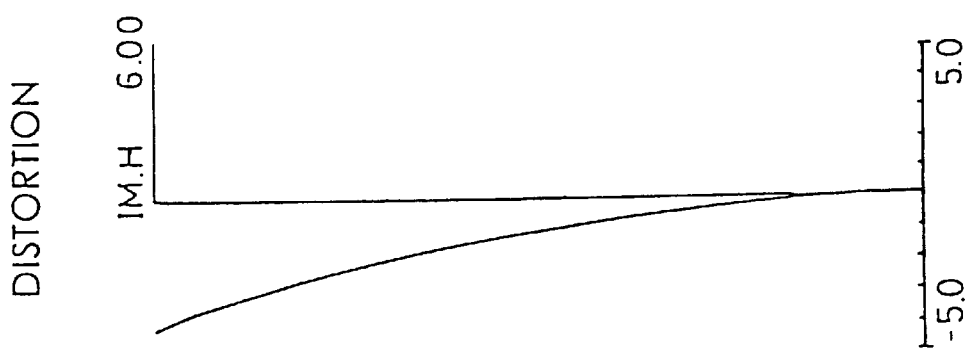

In example 7, a field lens is added to the eyepiece lens shown in example 5. The lens arrangement is shown in FIG. 13. The lens arrangement belongs to the inside focus type in which the field frame and the image to be magnified are arranged inside of the lens. Since the field lens is added, the pupil position can be variously controlled. In example 7, the lens has a telecentric structure in which an off-axial chief ray is substantially parallel to the optical axis on the side opposite to the eye. Thus, the lens has an advantage when it is combined with an objective lens having its exit pupil at infinity. Aberrations corresponding to a diopter of 0 D are shown in FIGS. 14(a), (b), (c), and (d). Each aberration is sufficiently compensated on a practical level.

Figure 6C:
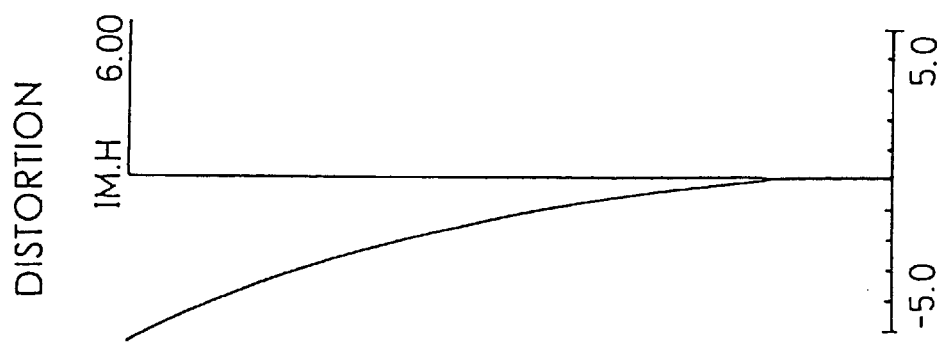

In the graphs of spherical aberration in FIGS. 6.(a), 10(a) and 14(a), the d, C and F lines overlap to be a single line.

The above examples are preferred as an eyepiece lens of an optical system of a telescope, a microscope, a viewfinder of a camera, a magnifier or the like.

This invention can provide an eyepiece lens adopting a radial gradient-index lens and comprising one or two lenses, wherein aberrations are sufficiently compensated on a practical level.

I claim:

1. An eyepiece lens comprising a single radial gradient-index lens having a positive refracting power, wherein the following Eqs. are satisfied:

$$1 < \Phi_m/\Phi < 1.5 \qquad (1)$$

$$|\Phi_{s1}| < -\Phi_{s2} \qquad (2)$$

$$-0.01 < 1/V_1 < 0.025 \quad (3)$$

where $\Phi$ is the refracting power of the radial gradient-index less, $\Phi_m$ is the refracting power of a medium of the radial gradient-index lens, $\Phi_{s1}$ is the refractive power of a surface located on an eye side of the radial gradient-index lens, $\Phi_{S2}$ is the refracting power of a surface located on an object side of the radial gradient-index lens, and $V_1$ is a coefficient of color dispersion of the medium of the radial gradient-index lens.

2. An eyepiece lens comprising, in the order from an eye side, a radial gradient-index lens having a positive refracting power, and a field lens, wherein the following Eqs. are satisfied:

$$1 < \Phi_m/\Phi < 1.5 \quad (1)$$

$$|\Phi_{s1}| < -\Phi_{s2} \quad (2)$$

$$-0.01 < 1/V_1 < 0.025 \quad (3)$$

where $\Phi$ is the refracting power of the radial gradient-index lens, $\Phi_m$ is the refracting power of a medium of the radial gradient-index lens, $\Phi_{s1}$ is the refractive power of a surface located on an eye side of the radial gradient-index lens, $\Phi_{s2}$ is the refracting power of a surface located on an object side of the radial gradient-index lens, and $V_1$ is a coefficient of color dispersion of the medium of the radial gradient-index lens.

3. An eyepiece lens according to claim 1, wherein the following Eqs. are satisfied:

$$-0.2 < \Phi_{S1}/\Phi < 0.3 \quad (4)$$

$$-0.7 < \Phi_{S2}/\Phi < -0.1 \quad (5)$$

4. An eyepiece lens according to claim 2, wherein the following Eqs. are satisfied:

$$-0.2 < \Phi_{S1}/\Phi < 0.3 \quad (4)$$

$$-0.7 < \Phi_{S2}/\Phi < -0.1 \quad (5)$$

5. An eyepiece lens according to claim 1, wherein the following Eq. is satisfied:

$$0 < N_2/\Phi^4 < 0.4 \quad (6)$$

where $N_2$ is a coefficient of the term of the fourth order of the gradient-index profile of the radial gradient-index lens.

6. An eyepiece lens according to claim 2, wherein the following Eq. is satisfied:

$$0 < N_2/\Phi^4 < 0.4 \quad (6)$$

where $N_2$ is a coefficient of the term of the fourth order of the gradient-index profile of the radial gradient-index lens.

7. An eyepiece lens according to claim 3, wherein the following Eq. is satisfied:

$$0 < N_2/\Phi^4 < 0.4 \quad (6)$$

where $N_2$ is a coefficient of the term of the fourth order of the gradient-index profile of the radial gradient-index lens.

8. An eyepiece lens according to claim 4, wherein the following Eq. is satisfied:

$$0 < N_2/\Phi^4 < 0.4 \quad (6)$$

where $N_2$ is a coefficient of the term of the fourth order of the gradient-index profile of the radial gradient-index lens.

* * * * *

UNITED STATES PATENT AND TRADEMARK OFFICE
CERTIFICATE OF CORRECTION

PATENT NO.    : 5,986,817
DATED         : November 16, 1999
INVENTOR(S)   : Hirofumi Tsuchida It is certified that error appears in the above-identified patent and that said Letters Patent is hereby corrected as shown below:

Column 1,
Line 22, change "ment" at beginning of line to -- ments --.

Column 2,
Line 42, change "embodiments" to -- embodiment --.

Column 3,
Line 33, change "a eyepiece" to -- an eyepiece --.
Line 38, change "aberration" to -- aberrations --.
Line 49, change "<1$\phi_m$..." to -- 1<$\phi_m$... --.

Column 4,
Line 9, delete "is" at beginning of line.
Line 14, change "value that" to -- value of --.
Line 43, change "strong" to -- strongly --.

Column 5,
Line 34, change "under" to -- reduced --.
Line 41, after "light" insert -- travels --.

Column 6,
Line 18, change "lox" to -- 10X --.

UNITED STATES PATENT AND TRADEMARK OFFICE
CERTIFICATE OF CORRECTION

PATENT NO. : 5,986,817
DATED : November 16, 1999
INVENTOR(S) : Hirofumi Tsuchida It is certified that error appears in the above-identified patent and that said Letters Patent is hereby corrected as shown below:

Column 7,
Line 53, change "systems" to -- system --.

Column 9,
Line 4, change "less..." to -- lens --.

Signed and Sealed this

Eighteenth Day of September, 2001

Attest:

NICHOLAS P. GODICI
Attesting Officer   Acting Director of the United States Patent and Trademark Office